United States Patent
Welfeld

(10) Patent No.: US 6,349,405 B1
(45) Date of Patent: Feb. 19, 2002

(54) PACKET CLASSIFICATION STATE MACHINE

(75) Inventor: Feliks J. Welfeld, Ottawa (CA)

(73) Assignee: Solidum Systems Corp., Ottawa (CA)

( * ) Notice: Subject to any disclaimer, the term of this patent is extended or adjusted under 35 U.S.C. 154(b) by 0 days.

(21) Appl. No.: 09/313,182

(22) Filed: May 18, 1999

(51) Int. Cl.$^7$ .............................................. G06F 9/44
(52) U.S. Cl. ........................... 717/3; 717/2; 717/11; 711/103; 712/231; 713/160
(58) Field of Search .................... 717/11, 3, 2; 711/100, 711/103; 712/230, 231; 713/160

(56) References Cited

U.S. PATENT DOCUMENTS

| 5,375,248 A | | 12/1994 | Lemay |
| 5,825,199 A | * | 10/1998 | Shelton et al. ................ 326/38 |
| 5,826,030 A | | 10/1998 | Hebert |
| 5,854,922 A | * | 12/1998 | Gravenstein et al. ....... 712/245 |

FOREIGN PATENT DOCUMENTS

| EP | 0 228 053 | 7/1987 |
| EP | 0 266 505 | 5/1988 |

OTHER PUBLICATIONS

Amann et al., "Optimal State Chains and State Codes in Finite State Machines", ACM, pages 153–170, Feb. 1989.*
Devadas, S., Newton, A.R., "Decomposition and Factorization of Sequential Finite State Machines," International Conference on Computer Aided Design, IEEE Computer Society Press, vol. Conf. 6, Nov. 7, 1988, Washington, pp. 148–151.
Villa, T., Sangiovanni–Vincentelli, A., "Nova: State Assignment of Finite State Machines for Optimal Two–Level Logic Implementation," IEEE Transactions on Computer Aided Design Of Integrated Circuits and Systems, vol. 9, No. 9, Sep. 1990, New York, pp. 905–924.
Lam, K., Devadas, S., "Performance–Oriented Decomposition of Sequential Circuits," Proceedings of the International Symposium on Circuits and Systems, IEEE, vol. Conf. 23 May 1, 1990, New York, pp. 2642–2645.
Ashar, P., Devadas, S., Newton, A.R., "Optimum and Heuristic Algorithms for Finite State Machine Decomposition and Partitioning," International Conference on Computer Aided Design, IEEE Computer Society Press, vol. Conf. 7, Nov. 5, 1989, Los Alamitos, pp. 216–219.
Table Update Serialization Technique, IBM Technical Disclosure Bulletin, vol. 21, No. 3, Aug. 1978, pp. 1158–1162, XP002154926, New York, USA.

* cited by examiner

Primary Examiner—Tuan Q. Dam
Assistant Examiner—Ted T. Vo
(74) Attorney, Agent, or Firm—Freedman & Associates

(57) ABSTRACT

A method of reprogramming classification data in a packet classification state machine without interrupting the operation of the state machine is disclosed. Data relating to a plurality of new nodes from a starting node of the classification tree within a classification tree are stored such that they accurately indicate subsequent nodes within the existing data structure. Once the data is stored, a new first node address is stored in a predetermined location. Thereby causing subsequent state machine executions to begin at a new node. The method allows a plurality of state machines to simultaneously use a same classification data memory because the method does not involve overwriting existing data.

11 Claims, 7 Drawing Sheets

PACKET CLASSIFICATION STATE MACHINE

FIELD OF THE INVENTION

The invention relates to programmable state machines and more particularly to programmable packet classification state machines for use in high-speed communication.

BACKGROUND OF THE INVENTION

In the past, programmable state machines were provided with procedural programming. This permits flow from one state to another state upon certain conditions according to a desired sequence. Because a state machine effectively controls a sequence of processing steps, the concept of a truly non-procedural programming method for a state machine appears contradictory. To this end, many "non-procedural" methods of programming state machines have been proposed. Nevertheless, upon analysis these have been found to be procedural or somewhat procedural. The concept of branches and loops is common in these methods and a flow diagram of operation is often evident.

Until now because of the procedural nature of state machines, non-procedural methods of programming the state machines have been regarded as having few advantages. Some of the "non-procedural" methods of programming a state machine focus on reuse of programming code and modularity of the code. Therefore, procedural elements within each state are not only permitted, but are viewed as somewhat essential. Different states, however, are commonly easily reused or assembled into a whole classification description.

When reprogramming a state machine, it is important to consider a concept of a truly non-procedural method of implementing a programmable state machine. Changes to state machine programming are then added without concern for state flow, since the description of the state machine is non-procedural. Further, implementation of the state machine is performed by the compiler and does not require significant design by a state machine designer or, more importantly, an end user.

Reprogramming of a state machine having procedural programming is considered a straightforward task. State machine execution is paused, new programming is loaded into program memory and then the state machine is restarted. The process of pausing the state machine often involves halting data flow, which is undesirable. For use in firewalls and other security applications, a change in programming often results from a change in security procedures. As such, it is important to load the change as quickly as possible. Of course, it is evident to one skilled in the art that it is often impractical to shut down a system during reprogramming and, hence reprogramming of a system often only occurs at certain times. This is inconvenient.

Another problem is encountered with current reprogramming techniques for programmable state machines when several state machines share a common program memory. When upgrading the programming for any of the state machines, all state machines are paused. This is a significant problem that is possibly avoided by duplicating program memory in order to allow all but one state machine to remain operative during a reprogramming operation. Another method of avoiding this problem is to provide each state machine with dedicated state machine memory.

A current area of research in high-speed state machine design is the area of digital communications. Commonly, in digital communication networks, data is grouped into packets, cells, frames, buffers, and so forth. The packets, cells etc, contain data and classification information. It is important to classify packets, cells, etc. for routing and correctly responding to data communications. An approach to classifying data of this type uses a state machine.

For Gigabit Etheniet, it is essential that a state machine operate at very high speeds to process data in order to determine addressing and routing information as well as protocol-related information. Unfortunately, at those speeds, memory access is a significant bottleneck in implementing a state machine or any other type of real time data processor. This is driving researchers to search for innovative solutions to increase classification performance. An obvious solution is to implement a classification state machine completely in hardware. Non-programmable hardware state machines are known to have unsurpassed performance and are therefore well suited to these high data rates; however, the implementation of communication protocols is inherently flexible in nature. A common protocol today may be obsolete in a few months. Therefore, it is preferable that a state machine for use with Gigabit Ethernet is programmable. In the past, solutions for 10 Mbit and 100 Mbit Ethernet data networks required many memory access instructions per state in order to accommodate programmability. This effectively limits operating speeds of the prior art state machines.

A programmable state machine for classification of data can be implemented entirely in software. Of course, software state machines are often much slower than their hardware equivalents. In a software state machine, each operation is performed by a software instruction and state changes result in branch operations. As is evident to those of skill in the art, to implement a high-speed state machine in software for packet classification, requires many instructions per second—many more than a billion—requiring expensive parallel processors or technologies unknown at present. In fact, a severe limitation to performance is the speed of memory devices. For example, should a 7 ns memory device be used, less than one memory access per memory device is possible for each bit of a Gigabit Ethernet stream. Thus, if each byte—8 bits—of data is processed in a single state, only one memory access operations is possible for each state. To implement such a system as a purely software solution is impractical and unlikely.

Current state of the art integrated memory devices achieve performance in the area of 7 ns per memory access when timing and other factors are taken into account. Therefore, pure hardware implementations of state machines fast enough to implement a Gigabit Ethernet packet classifier are possible so long as only one memory access is required for every 8 bits within the Ethernet data stream. Prior art implementations of such a state machine use a branching algorithm to allow state transitions within the time frame of a predetermined number of bits. The address data for the branching algorithm is stored in program memory. When the predetermined number of bits is 8, each state transition occurs within 8 ns. One method of achieving this performance is to store a table of data having 256 entries for each possible state. The table address is then concatenated with 8 bits from the data stream to determine a next state address. This continues until a value indicative of a classification or a failure to classify is encountered.

Unfortunately, the amount of memory required to implement a system, such as that described above, is prohibitive. For example, using 8 bits at a time requires up to 256 entries per table, 16 bits at a time requires 65,536 entries. The exact number of tables also depends on a number of terminal states. Since integrated memory having a high storage capacity is not available, implementation of a prior art programmable packet classification state machines having large numbers of edges in integrated memory is currently not feasible.

It has been found that a programmable hardware state machine for use in packet classification of high-speed data communications wherein reprogramming of the state machine is performed according to a non-procedural method, would be advantageous.

It would also be advantageous to provide a method of programming a state machine such that easy modification of state machine programming is possible during operation of a plurality of state machines using, the same program memory.

OBJECT OF THE INVENTION

In order to overcome these and other limitations of the prior art, it is an object of the invention to provide state machine memory architecture for supporting a plurality of state machines simultaneously.

It is another object of the present invention to provide a method of reprogramming state machine program memory without requiring disruption of state machine operation.

STATEMENT OF THE INVENTION

In accordance with the invention there is provided a method of programming state machine memory, the state machine memory comprising a plurality of storage locations including a first state address storage location, comprising the steps of:
 providing data corresponding to each new state, the data including data corresponding to all states preceding each new state including a new first state;
 storing the data within the program memory, data relating to each new state stored at a state address for said new state, the data stored in unoccupied storage locations;
 storing data relating to the new first state at the new first state address, the data stored in an unoccupied storage location; and
 once the data corresponding to each new state is stored, replacing data within the first state address location with the new first state address.

In accordance with the invention there is provided a method of programming state machine memory wherein the state machine memory is for simultaneous use by a plurality of state machines, and wherein programming of a first state machine from the plurality of state machines is same as programming of a second state machine of the plurality of state machines. Furthermore, there is provided a method of programming state machine memory wherein programming of a first state machine from the plurality of state machines is different from programming of a second state machine of the plurality of state machines.

In different embodiments of the invention programming of the state machine is performed during execution of the state machine, and programming of the state machine is performed without interruption of execution of the state machine.

In an embodiment the state machine memory is for simultaneous use by a plurality of state machines. According to this embodiment the programming of each of the plurality of state machines may is optionally same programming or some state machines have different programming. Optionally, programming of a state machine from the plurality of state machines is performed during execution of the plurality of state machines without interruption of execution of any other state machine from the plurality of state machines; programming of a state machine from the plurality of state machines is performed during execution of the plurality of state machines without interruption of execution of any state machine from the plurality of state machines; and/or programming of a state machine from the plurality of state machines, data relating to another state machine from the plurality of state machines remains unaltered.

In accordance with the invention there is also provided a method of programming state machine memory, the state machine memory comprising a plurality of locations and a first state address storage location, comprising the steps of:
 providing an image of current state machine memory on a computer;
 altering the state machine programming;
 determining states that are modified within the current state machine;
 determining states preceding the states that are modified including a new first state;
 determining unoccupied memory locations within the current state machine memory;
 compiling the modified states and the states preceding the states that are modified for storage in unoccupied memory, location s within the Current state machine memory to form reprogramming data;
 storing, the reprogramming data within the unoccupied memory locations within the current state machine memory;
 once the reprogramming data is stored, replacing data within the first state address location with the new first state address; and,
 updating the image of the current state machine.

In an embodiment the method also comprises the step of:
 determining an amount of unoccupied memory;
 determining if the reprogramming data will fit within the unoccupied memory; and,
 when the reprogramming data will not fit within the unoccupied memory, compiling a portion of the modified states and the states that precede them to form new reprogramming data an d replacing the reprogramming data with the new reprogramming data.

In accordance with another aspect of the invention there is provided a reprogrammable state machine memory for simultaneous use by a plurality of state machines, the reprogrammable state machine memory comprising:
 a program memory for storing data relating to states within each state machine, the data for each state stored at a state address;
 a plurality of initial state address memory locations, each initial state address memory location for storing a first state address of a state machine from the plurality of state machines,
 means for storing the data within the program memory, data relating to each new state stored at a state address for said new state and data relating to the new first state stored at the new first state address, the data stored in storage locations unoccupied by any of the plurality of state machines; and,
 means for once the data corresponding to each new state is stored, replacing data within the first state address location with the new first state address.

BRIEF DESCRIPTION OF THE DRAWINGS

An exemplary embodiment of the invention will now be described in conjunction with the attached drawings, in which.

DETAILED DESCRIPTION OF THE INVENTION

As used herein, the term data packet encompasses the terms buffer, frame, cell, packet, and so forth as used in data communications. Essentially a data packet is a grouping of data that is classifiable according to a predetermined classification. Classifications are commonly codified by standards bodies, which supervise communication standards.

Figure 1A:
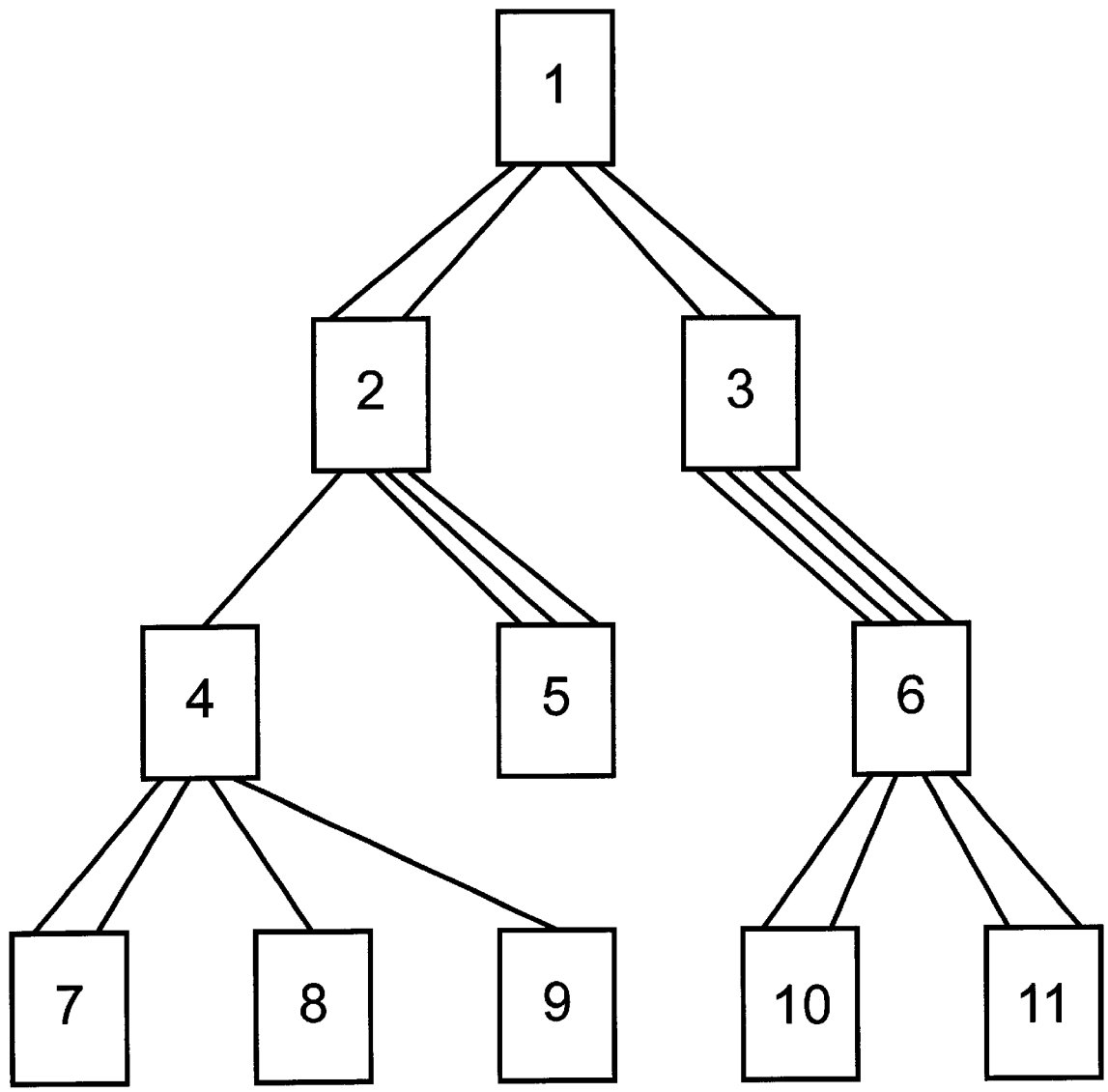
FIGS. 1a and 1b are simplified state diagrams for classification state machines according to the prior art.

Referring to FIG. 1a, a simplified state diagram for a state machine supporting a single data access operation per data cycle is shown. Each state is in the form of a look-up table at a state address. The states are represented as blocks having four state transitions, each shown as a line to another state. Sometimes, several state transitions lead to a same next state. A predetermined number of bits (2 for the simple diagram of FIG. 1a) is loaded into the lowest order bits of the address, and data from the newly formed address is read. When the data comprises another state address, the next predetermined number of bits from the data stream is loaded into the lowest order bits. Otherwise an action such as filtering or packet classification is performed.

Generally, in order to reprogram such a state machine it is necessary to interrupt operation of the state machine, which results in unwanted "downtime". New programming is stored in the state machine memory after which state machine execution proceeds. Unfortunately, data flow does not stop when filtering or classification is unavailable. Therefore, a method of reprogramming the state machine without interrupting the operation of the state machine is desirable.

Figure 1B:
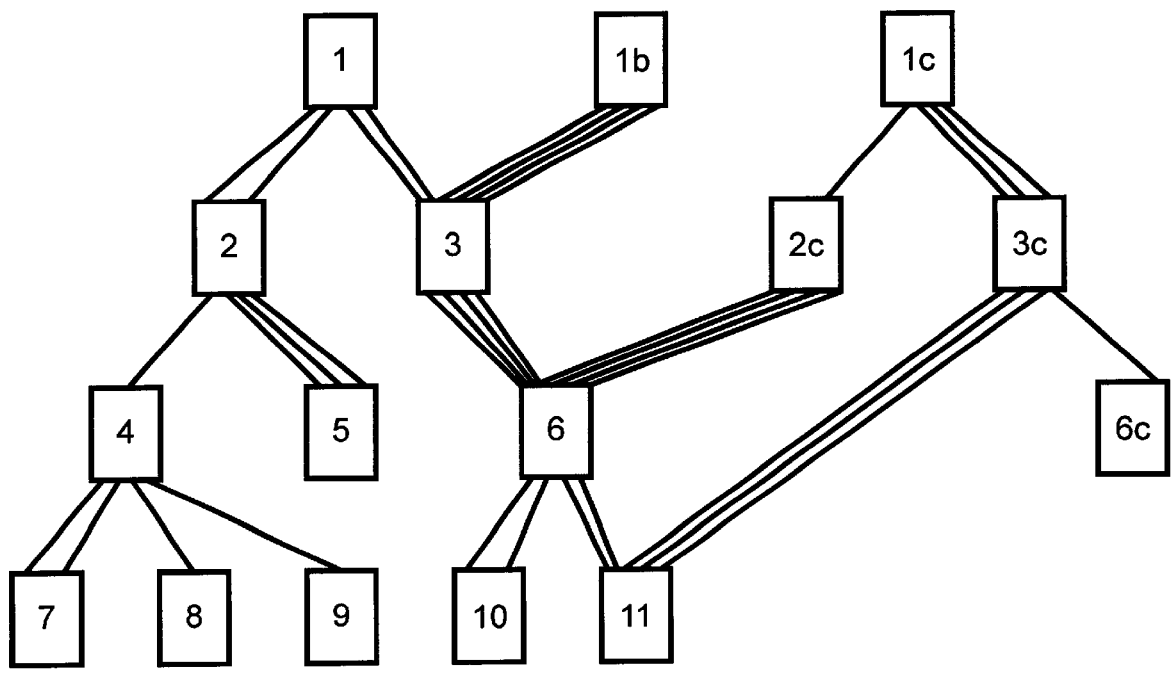

In light of the above, it will be evident that interruption of a single state machine's processing capabilities has negative implications. In contrast, where a plurality of state machines share a single memory, reprogramming of one of the plurality of state machines results in "downtime" for all the state machines that share the single memory. Referring to FIG. 1b, shown is a similar state diagram to that of FIG. 1a in which three state machines share a same program memory. As is evident from FIG. 1d each state machine executes a different programming. Presently, it is difficult to reprogram the state machine memory of FIG. 1b without interrupting execution of all three state machines.

Figure 2:
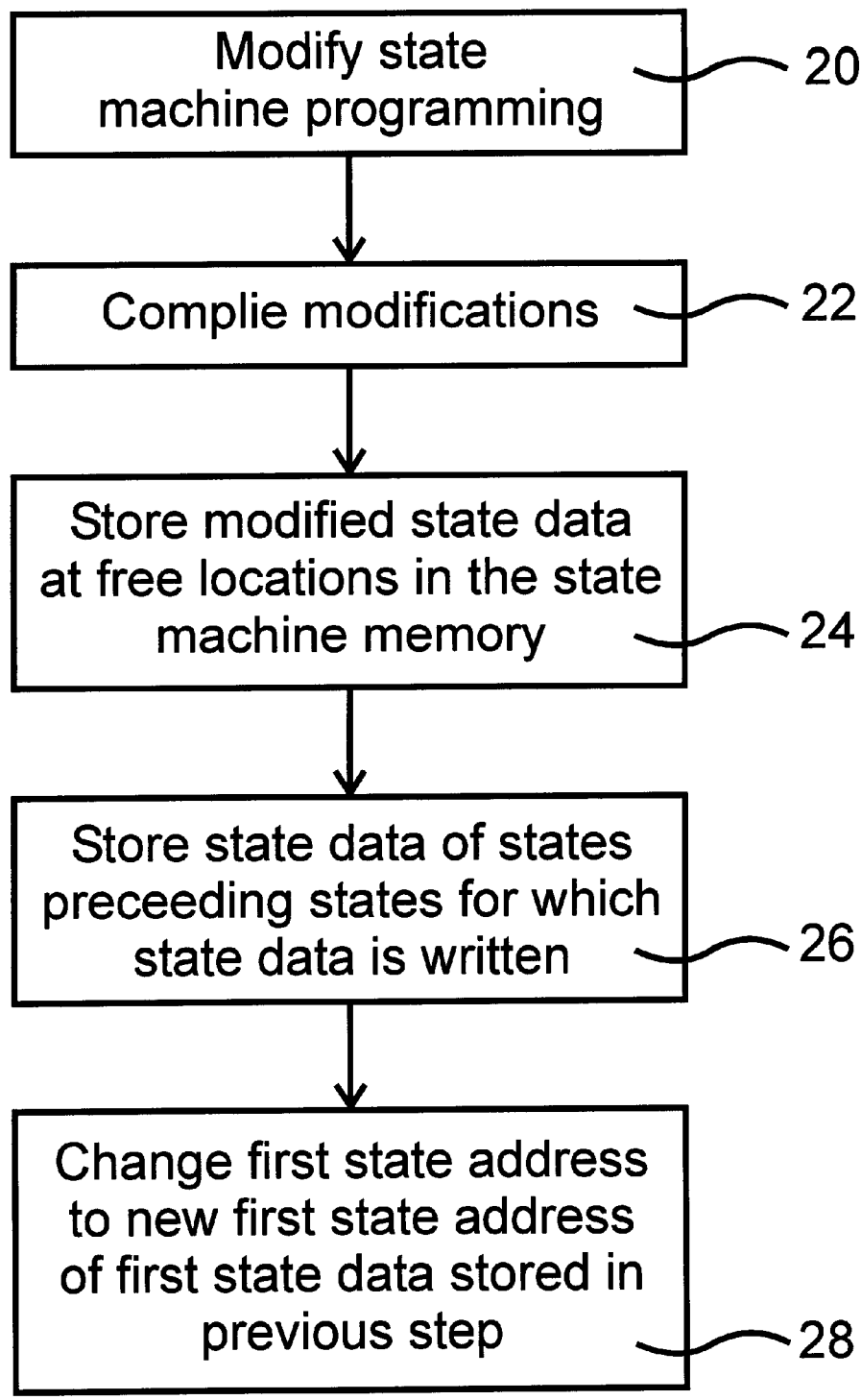
FIG. 2 is a simplified flow diagram of a method according to the invention.

Referring to FIG. 2, a simplified flow diagram of a method according to the invention is shown. A state machine executes an acyclic classification function. The state machine is based on a table look-up for each state transition and information relating to each state transition is stored as a table of data at a state address. In operation, a first state address is read from a first state address storage location. The first state address is an address that is read at a start of state machine operation. The first state address indicates a first table.

A programmer of the state machine comprises a processor for differentiating between storage locations that contain state machine data and those that do not. Commonly, this is performed by maintaining information relating to locations where current state machine information is stored. The programmer is provided with modifications to current state machine programming 20. For example, a table of data 22 relating to a second state of the state machine is modified. The programmer writes any new information to the memory in storage locations that are free 24. Free storage locations do not contain current state machine programming data.

As is evident to those of skill in the art, in order to link the newly written states into the existing states within the state machine requires modification of some states, which is not easily performed during operation of one or more state machines. One approach to solving this problem is to stop operation of the state machine until the reprogramming is complete. Stopping operation of the state machine prevents data being processed and is therefore undesirable. According to the invention, each state preceding any modified states is also written to free program memory 26. The newly written states form a start of the state machine programming from a beginning of state machine operation until a point in the state machine programming from which no further modifications are being made. Once the data is written, the first state of the newly written data is a first state of the state machine 28. Therefore, by modifying the information stored in the first state address location, the newly written state data is used during a subsequent execution of the state machine—the modified state machine is executed. The term "modified state" as used herein denotes states that are modified as well as those states that are newly created. It will be apparent from the above description that reprogramming of the state machine memory is now possible during state machine operation absent pausing state machine execution. Once the first state address is updated, a subsequent execution of the state machine uses the programming of the modified state machine. However, until the first state address is updated, the unmodified programming of the state machine is executed.

Of course, once the first address is updated, storage locations associated with states that are modified—state data was rewritten for those states—become free storage locations given that data for those states is not in use by another different state machine. The resulting free storage locations are then used in further processes of reprogramming the state machine memory.

Figure 3:
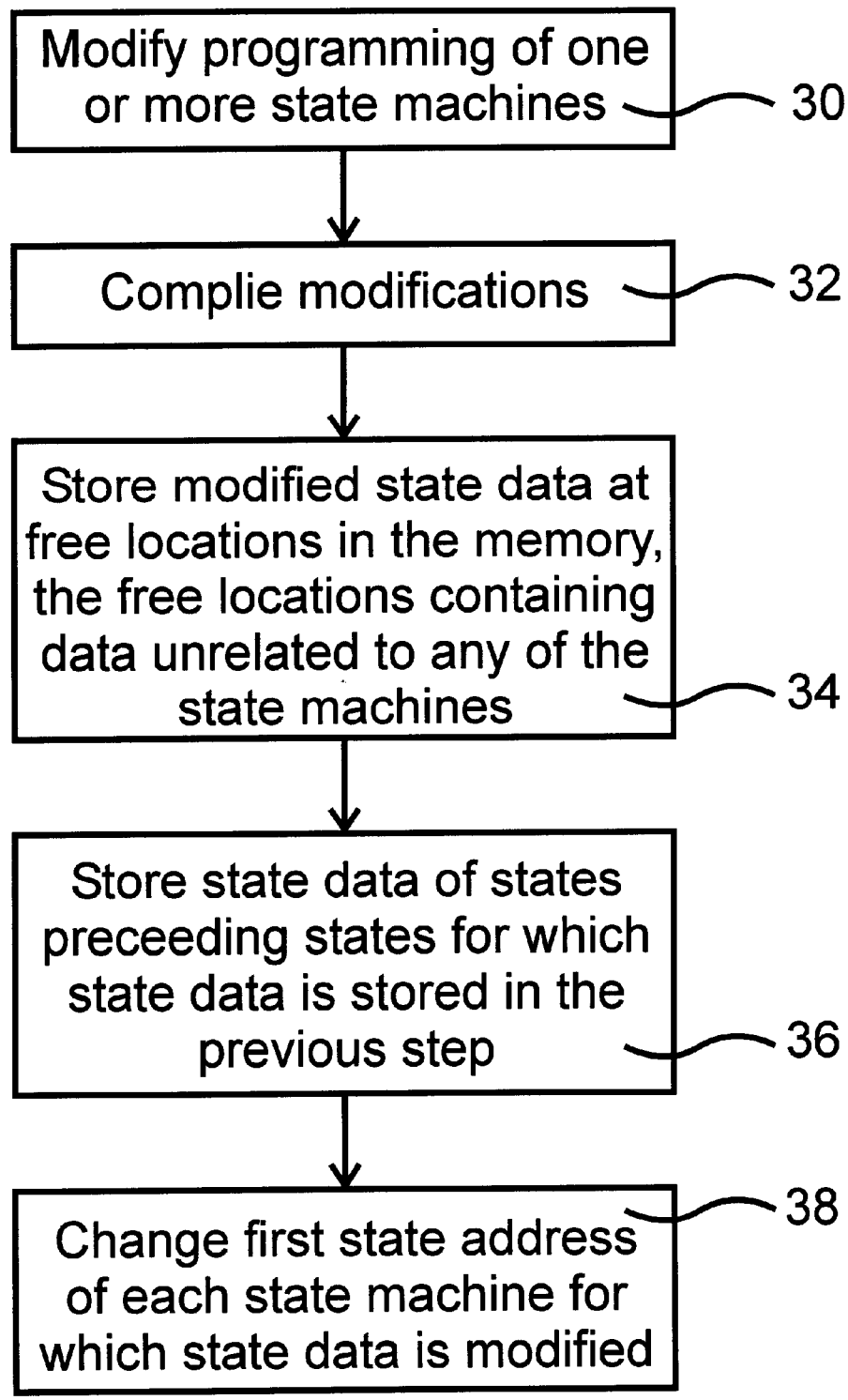
FIG. 3 is a simplified diagram of a method of reprogramming a state machine during execution.

Referring to FIG. 3, a method of reprogramming a state machine during execution and according to the invention is shown. The method shown is for state machine program memory in concurrent use by a plurality of state machines.

Each state machine executes an acyclic classification function. The state machines, similar to the state machine described with reference to FIG. 2, are based on a table look-up for each state transition and information relating to each state transition is stored as a table of data at a state address. In operation, a first state address is read from a first state address storage location. The first state address is an address that is read at a start of state machine operation of each state machine. When state machines are individually programmable, each state machine has an associated first state address.

A programmer of the state machine comprises a processor for differentiating between storage locations that contain state machine data and those that do not. Commonly, this is performed by maintaining information relating to locations where information of current state machines is stored. The programmer is provided with modifications to programming of current state machines 30. For example, a table of data 32 relating to a second state of the first state machine is modified. The programmer writes any new information to the memory in storage locations that are free 34. Free storage locations do not contain state machine programming data relating to any current state machine 34. According to the invention, each state preceding any modified states is also written to free program memory 36. The newly written states form a start of the state machines' programming from a beginning of state machines' operation until a point in the state machines' programming from which no further modifications are being made 38. Once the data is written, the first states of the newly written data are first states of the state machines. Therefore, by modifying the information stored in the first state address locations the newly written state data is used during subsequent executions of the state machines, i.e., the modified state machines are executed.

It will be apparent from the above description that reprogramming of the state machine memory is possible during execution of any number of state machines. Once one of the first state addresses is updated, any subsequent execution of the associated state machine involves the modified state machine programming. Until a first state address is updated, unmodified state machine programming is executed. In this manner, when each state machine is in execution of different programming, the present invention permits reprogramming of one state machine without interrupting operation of other state machines.

In an embodiment of the present invention, the amount of free memory storage locations is determined. After the determination, if data for writing to the free locations exceeds the amount of memory storage locations that is free, a portion of the modified state machine programming is compiled independently and updated and then another portion etc. This method is advantageous in optimizing memory requirements for multi-state machine memory configurations. Updating each state machine independently often reduces free memory locations required over that of updating two or more state machines at a same time.

In an alternative embodiment, a timer is provided for providing a timing signal to pause state machine execution when the timer has expired. This is useful for programming of the programmable memory where a program must be stored by a certain time but also may be stored anytime prior. The program is entered and reprogramming is performed according to the above-described method. If reprogramming is not completed within the specified time, the state machine is paused between classification operations and the programming is completed.

Figure 4:
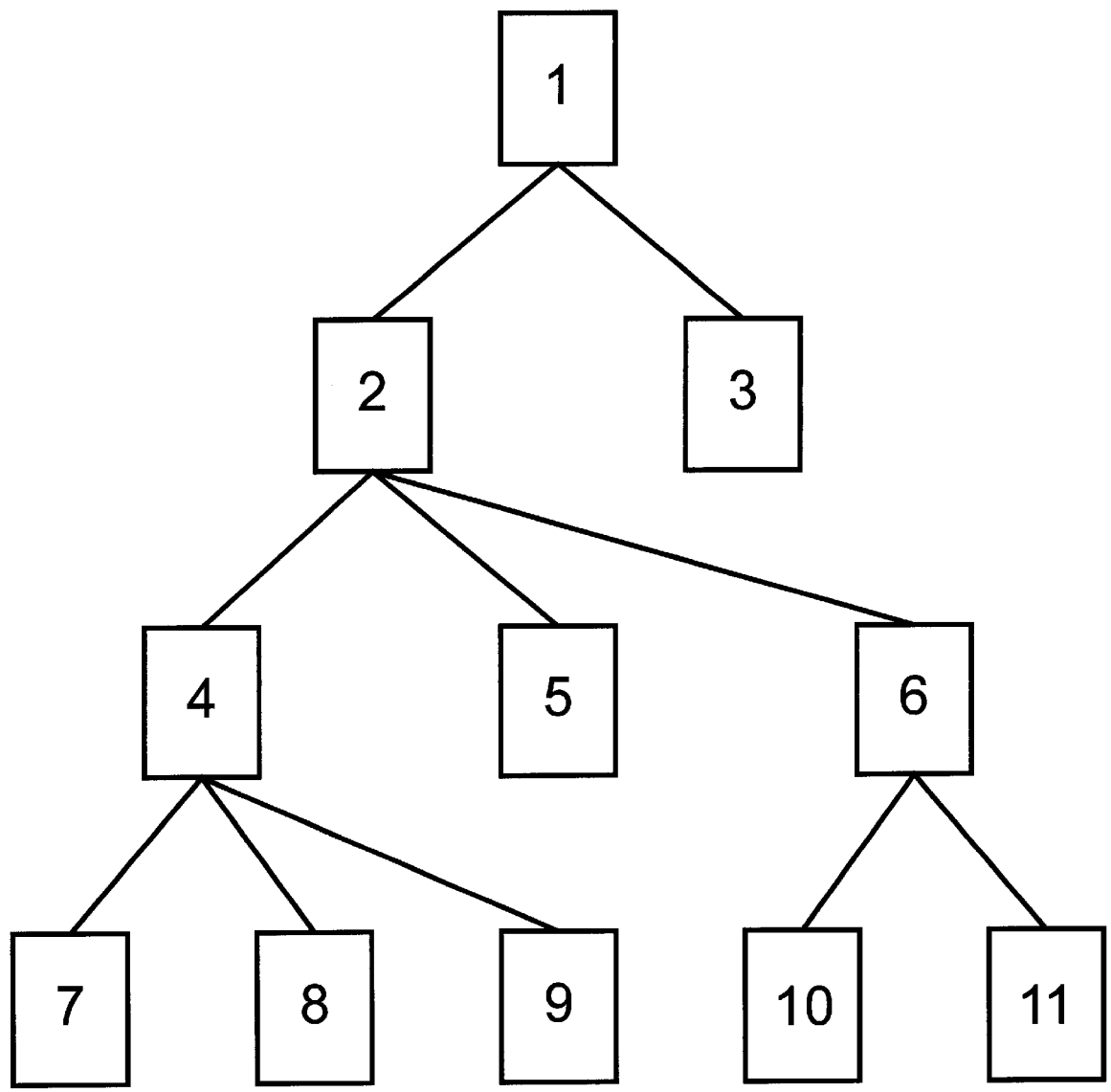
FIG. 4 is simplified state diagram of a greatly simplified state machine.
Figure 5:
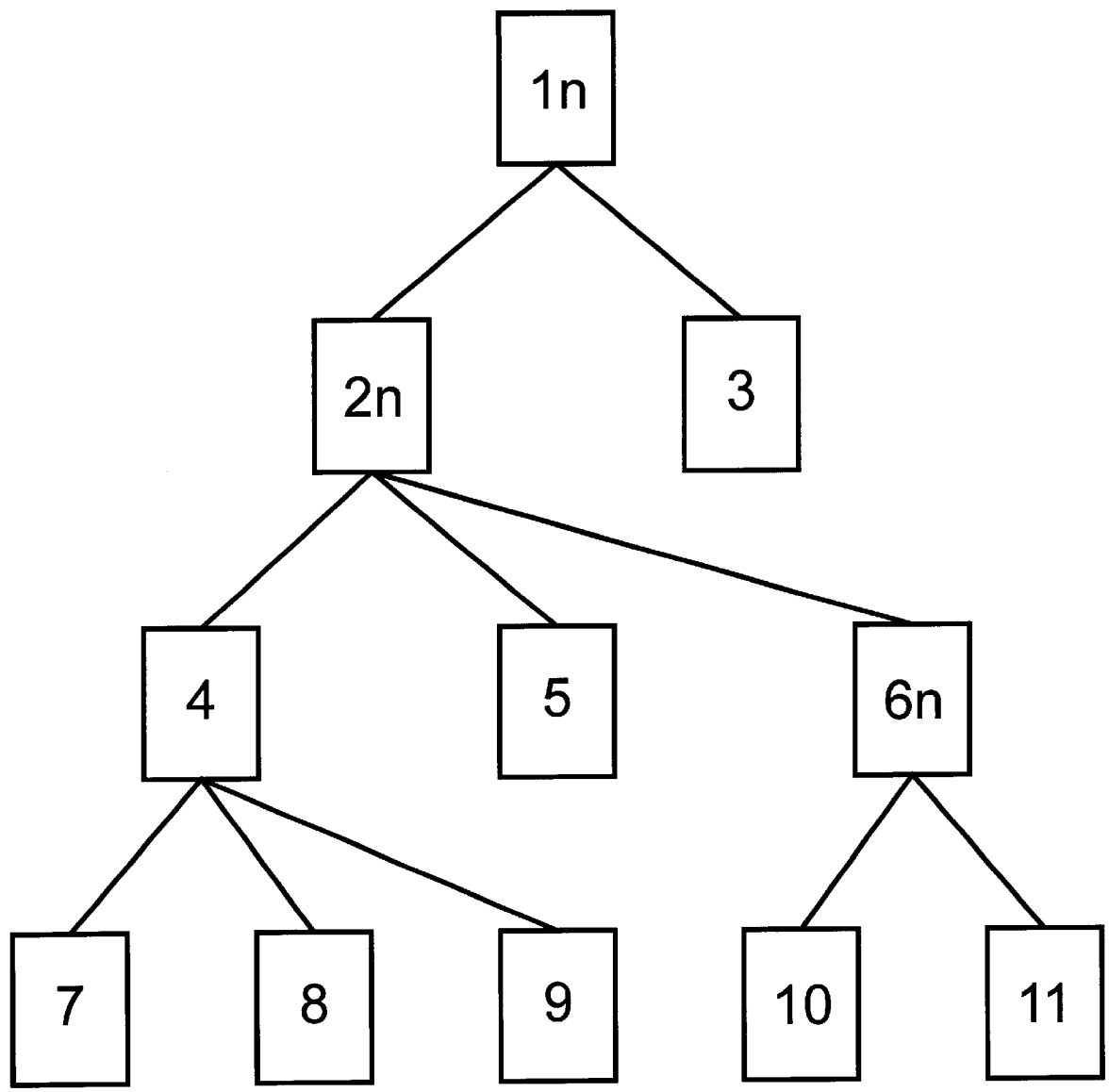
FIG. 5 is simplified state diagram of the greatly simplified state machine of FIG. 4 with modifications thereto.
Figure 6:
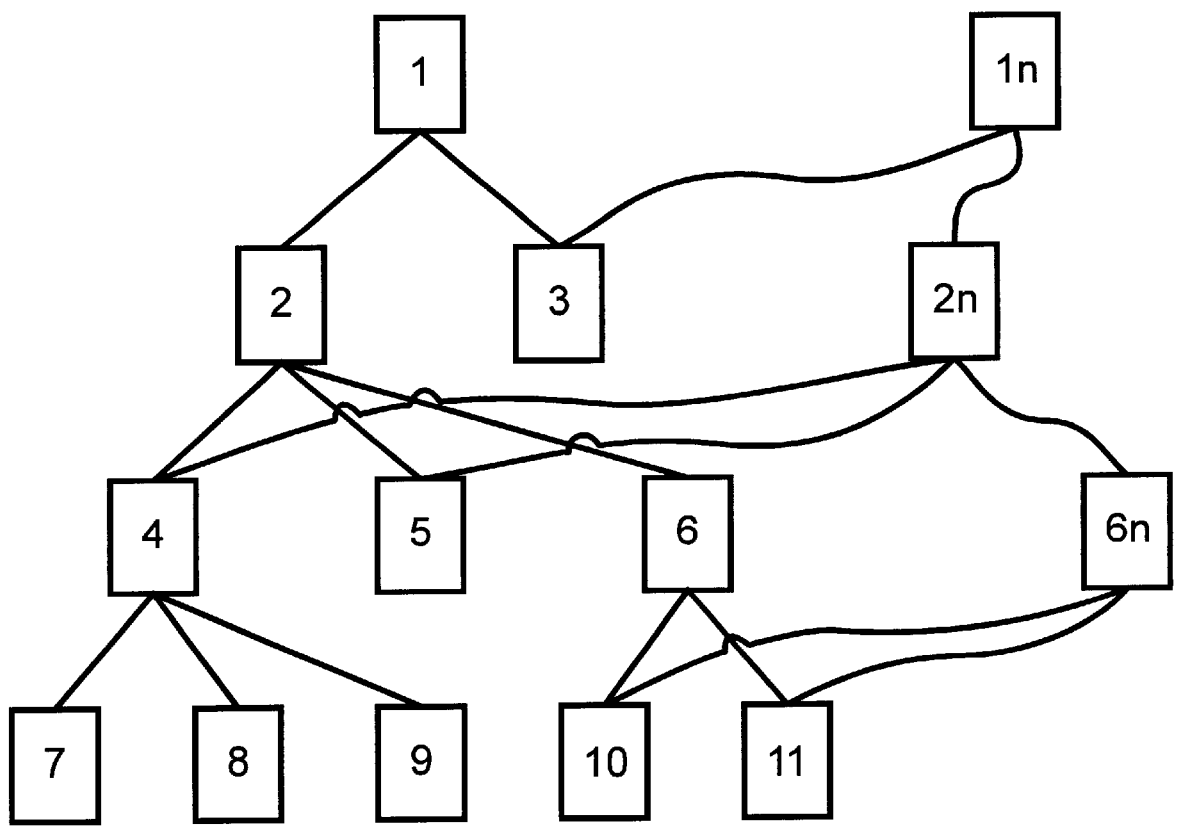
FIG. 6 is a simplified diagram of the memory contents of the state machine memory for the state diagrams of FIGS. 4 and 5.

A non-limiting example of an application of the present invention is shown with reference to FIGS. 4, 5, and 6. FIG. 4 is a state diagram of a current state machine having states 1 to 11. When it is desired to modify states 1, 2 and 6, prior art devices require pausing of state machine execution. For ease of description, the state diagram is shown with eleven states, however, in practice the number of states is only limited by the memory size of the state machine and the operation performed. Alterations are made to an image of the state machine of FIG. 4 resulting in a state machine represented by the state diagram of FIG. 5 having modified states $1n$, $2n$ and $6n$. As one skilled in the art will appreciate, it is possible to modify or add many new states, the number of which is only limited by the memory size of the state machine memory. Memory contents for the state machine illustrated in FIG. 4 are shown in FIG. 6 along with the modified states $1n$, $2n$ and $6n$. Data relating to the new and/or modified states, i.e., $1n$, $2n$ and $6n$ are written into unoccupied memory storage locations. In FIG. 6 the state machine programming for both state machines, that of FIG. 4 and that of FIG. 5, are evident within the state diagram. From state 1 a first state diagram proceeds and from state In a second other state diagram proceeds. The states 3, 4, 5, 7, 8, 9, 10, and 11 are common to both state diagrams. In order to distinguish between the state machine of FIG. 4 and that of FIG. 5, one must determine the start address of the state machine. Once all the new and/or modified state data are stored in memory the start address of the state machine is updated with a new first state address, that of state $1n$. The next time the state machine begins execution, it uses the newly stored data. Sufficient state machine memory is provided to allow use of either state machine programming depending on the selected start address. Thus, even if three state machines use identical programming, it is possible to modify the programming of one and not the others. It is important that state transitions are maintained during modification of state machine programming to prevent "downtime". When the start address is that of state in, the state machine diagram of FIG. 5 is the current state machine diagram having modified states $1n$, $2n$ and $6n$. Memory locations associated with states that are not accessed by any state machine—in this case by the single state machine—are now "free" storage locations or unoccupied storage locations.

It is evident to those of skill in the art that all memory locations are occupied and that the term "unoccupied" as used herein refers to memory locations that are not occupied by current state machine program data.

Numerous other embodiments of the invention are envisioned without departing from the spirit or scope of the invention.

What is claimed is:

1. A method of programming state machine memory, the state machine memory comprising a plurality of storage locations including a first state address storage location, comprising the steps of:

providing data corresponding to each new state, the data including data corresponding to all states preceding each new state including a new first state;

storing the data within the program memory, data relating to each new state stored at a state address for said new state, the data stored in unoccupied storage locations;

storing data relating to the new first state at the new first state address, the data stored in an unoccupied storage location;

once the data corresponding to each new state is stored, replacing data within the first state address location with the new first state address;

determining an amount of unoccupied storage locations determining if reprogramming data will fit within the unoccupied storage locations; and when the reprogramming data will not fit within the unoccupied storage locations, compiling portion of the modified states and the states that precede them to form reprogramming data and replacing the data corresponding to each new state with new reprogramming data.

2. A method as defined in claim 1 wherein the programming of the state machine is performed during execution of the state machine.

3. A method as defined in claim 2 wherein the programming of the state machine is performed without interruption of execution of the state machine.

4. A method as defined in claim 2 wherein the state machine memory is for simultaneous use by a plurality of state machines, and wherein programming of a state machine from the plurality of state machines is same as programming of a further state machine of the plurality of state machines.

5. A method as defined in claim 1 wherein the state machine memory is for simultaneous use by a plurality of state machines, and wherein programming of a state machine from the plurality of state machines is different from programming of a further state machine of the plurality of state machines.

6. A method as defined in claim 1 wherein the state machine memory is for simultaneous use by a plurality of state machines, and wherein programming of a state machine from the plurality of state machines is performed during execution of the plurality of state machines without interruption of execution of any other state machine from the plurality of state machines.

7. A method as defined in claim 1 wherein the state machine memory is for simultaneous use by a plurality of state machines, and wherein programming of a state machine from the plurality of state machines is performed during execution of the plurality of state machines without interruption of execution of any state machine from the plurality of state machines.

8. A method as defined in claim 1 wherein the state machine memory is for simultaneous use by a plurality of state machines, and wherein during programming of a state machine from the plurality of state machines, data relating to another state machine from the plurality of state machines remains unaltered.

9. A method of programming state machine memory, the state machine memory comprising a plurality of locations and a first state address storage location, comprising the steps of:

provos an image of current state machine memory on a computer;

altering the state machine programming;

determining states that are modified within the current state machine;

determining states preceding the states that are modified including a new first state;

determining unoccupied memory locations within the current state machine memory;

compiling the modified states and the states preceding the states that are modified for storage in unoccupied memory locations within the current state machine memory to form reprogramming data;

storing the reprogramming data within the unoccupied memory locations within the current state machine memory;

once the reprogramming data is stored, replacing data within the first state address location with the new first state address; and, updating the image of the current state machine.

10. A method as defined in claim 9 comprising the steps of:

determining an amount of unoccupied memory;

determining if the reprogramming data will fit within the unoccupied memory; and, when the reprogramming data will not fit within the unoccupied memory, compiling a portion of the modified states and the states that precede them to form new reprogramming data and replacing the reprogramming data with the new reprogramming data.

11. A reprogrammable state machine memory for simultaneous use by a plurality of state machines, the reprogrammable state machine memory comprising:

a program memory for storing data relating to states within each state machine, the data for each state stored at a state address;

a plurality of initial state address memory locations, each initial state address memory location for storing a first state address of a state machine from the plurality of state machines;

means for storing the data within the program memory, data relating to each new state stored at a state address for said new state and data relating to the new first state stored at the new first state address, the data stored in storage locations unoccupied by any of the plurality of state machines;

means for once the data corresponding to each new state is stored, replacing data within the first state address location with the new first state address;

means for determining an amount of unoccupied storage locations;

means for determining if reprogramming data will fit within the unoccupied storage locations; and when the reprogramming data will not fit within the unoccupied storage location, means for compiling a portion of the modified states and the states that precede them to form reprogramming data and replacing the data corresponding to each new state with new reprogramming data.

* * * * *